United States Patent
Zafirov et al.

(10) Patent No.: US 6,743,494 B1
(45) Date of Patent: Jun. 1, 2004

(54) RECORDING MEDIUM FOR OPTICAL DATA STORAGE DEVICES, METHOD FOR PRODUCING SAID RECORDING MEDIUM AND OPTICAL DATA STORAGE DEVICE WITH A CORRESPONDING RECORDING LAYER

(75) Inventors: Atanas Zafirov, Zug (CH); Slavtcho Rakovski, Allenwinden (CH); Jana Bakardjieva-Eneva, Allenwinden (CH)

(73) Assignee: Interaxia AG, Zug (CH)

( * ) Notice: Subject to any disclaimer, the term of this patent is extended or adjusted under 35 U.S.C. 154(b) by 0 days.

(21) Appl. No.: 09/914,743

(22) PCT Filed: Mar. 6, 2000

(86) PCT No.: PCT/CH00/00125

§ 371 (c)(1),
(2), (4) Date: Feb. 4, 2002

(87) PCT Pub. No.: WO00/54264

PCT Pub. Date: Sep. 14, 2000

(30) Foreign Application Priority Data

Mar. 5, 1999 (CH) ................................................ 416/99

(51) Int. Cl.⁷ .................................................. B32B 3/02
(52) U.S. Cl. ................. 428/64.1; 428/64.8; 430/270.14
(58) Field of Search ............................... 428/64.1, 64.4, 428/64.8, 913; 430/270.14, 270.19, 495.1, 945; 369/283, 288

(56) References Cited

U.S. PATENT DOCUMENTS

| | | |
|---|---|---|
| 5,204,220 A | 4/1993 | Yanagisawa et al. |
| 5,436,113 A | 7/1995 | Tsuji et al. |
| 5,731,054 A | 3/1998 | Chapman et al. |
| 5,900,348 A | 5/1999 | Hu et al. |
| 5,922,504 A | 7/1999 | Chapman et al. |

FOREIGN PATENT DOCUMENTS

| | | |
|---|---|---|
| EP | 0 403 797 B1 | 12/1990 |
| JP | 58-69255 | 4/1983 |
| JP | 7-314897 | 12/1995 |
| JP | 52-47824 | 4/1997 |

OTHER PUBLICATIONS

Patent Abstracts of Japan, "Optical Information Recording Medium", Publication No. 63009577, Publication Date Jan. 16, 1988.
XP–002137272, "Optical recording medium—having thermal deformation of organic dye recording layer by photo–irradiation".
WO 93/22142, "Stabilizers for Cyanine IR Dyes", Publication Date: Nov. 11, 1993.
WO 98/14612, "Cyanine Dyes With High–Absorbance Cross Section as Donor Chromophores in Energy Transfer Labels", Publication Date: Apr. 9, 1998.
WO 99/37717, "Asymmetric Cyanine Dye Quenchers", Publication Date: Jul. 29, 1999.
WO 98/34988, "Photostabilized Cyanine Dyes and Optical Recording Medium", Publication Date: Aug. 13, 1998.
WO 99/05221, "Cyanine Dyes", Publication Date: Feb. 4, 1999.

*Primary Examiner*—Elizabeth Mulvaney
(74) *Attorney, Agent, or Firm*—Rankin, Hill, Porter & Clark LLP

(57) ABSTRACT

In addition to a cationic dye and at least one substance which functions as a quenching agent, the inventive recording medium contains a stabiliser in order to increase the stability of the optical data storage device, which has a recording layer consisting of such a recording medium. The stabiliser is a phenol with one or more hydroxy groups, which is advantageously present in the recording medium in the form of a phenolate ion and which forms part of the anions for the dye cations. In addition, the recording medium can also contain an anionic, metallo-organic thiolene complex, which replaces a usual quencher and forms another part of the anions for the dye cations.

14 Claims, No Drawings

RECORDING MEDIUM FOR OPTICAL DATA STORAGE DEVICES, METHOD FOR PRODUCING SAID RECORDING MEDIUM AND OPTICAL DATA STORAGE DEVICE WITH A CORRESPONDING RECORDING LAYER

The invention is situated in the field of optical data storage devices, in particular optical data storage devices, which can be written to and read from by means of lasers. The invention relates to a recording medium for the recording layer of such a data storage device, to a method for the production of the recording medium and to an optical data storage device with a recording layer consisting of the recording medium, each in accordance with the generic term of the corresponding independent claim.

Optical data storage devices, which can be written to and read from by means of lasers (e.g., CD-R, DVD-R, DVD-RAM, DVD-RW or HD) usually comprise a disc-shaped, transparent carrier usually consisting of polycarbonate and on one side comprising a usually spiral-shaped recording groove and on this side usually being coated with three layers. These three layers are a recording layer, a reflective layer and a protective varnish layer. The recording layer is located directly on the carrier material on the side of the carrier structured by the groove and consists of a recording medium. This medium contains a dye or a mixture of dyes, the optical characteristics of which are changeable by a laser beam (writing beam). The reflecting layer is located on the recording layer and usually consists of a metal (e.g., silver, gold or aluminium). The protective varnish layer is located on the reflective layer and usually consists of a resin varnish, which is hardenable with ultraviolet light.

For writing, the data storage device is moved relative to a laser beam (writing beam) in the direction of the groove (rotated) and is written to by the laser, whereby the laser is directed onto the reflective layer through the carrier and the recording layer. In this, the wavelength range and the energy of the writing beam are designed in such a manner, that the absorption of the laser light in the recording layer leads to a local heating-up, through which between the carrier material and recording layer a bubble-shaped pit is produced and through which the chemical reaction in the recording layer leads to local change of the optical characteristics (e.g., de-colouring/bleaching) of the dye contained in this layer. The recording on the optical data storage device essentially consists of a sequence of points changed by the writing beam with a pit and chemically changed dye or dye mixture and unchanged points.

For reading, the data storage device is again moved relative to a laser beam in the direction of the groove, whereby the laser beam has a lower intensity than the writing beam and once again is directed onto the reflective layer through the carrier and the recording layer. Variations in the reflection of the laser beam (stronger and weaker reflection) at changed or unchanged points are evaluated as reading signals.

A production process for such data storage devices, for example, evolves in the following process steps:

Manufacturing of the polycarbonate carrier by injection moulding, coating of the rotating carrier with a solution, in which the components of the recording medium are contained dissolved or as a colloid in an organic solvent or solvent mixture, wherein the solution is distributed over the carrier by means of centrifugal force and superfluous solution is centrifugally thrown off, removal of the solvent or solvent mixture by volatilising, application of the reflective layer by "sputtering", application and hardening of a protective varnish.

The steps mentioned above are usually carried out in a continuous process, into which advantageously also checking steps are integrated. Such checking steps serve for mostly optical checks of intermediate products and for elimination of defective products.

Continually increasing demands are made of the data storage devices described above, which demands above all relate to speed of writing and reading, to quality of writing and reading, to durability and last but not least, to the price. Writing and reading characteristics as well as durability and price of the data storage devices are to a great degree dependent on the characteristics of the recording layer, so that the demands of this layer are many and diverse. In particular, this layer is to make possible a suitable chemical reaction for the writing process, which for rapid writing is to require as little energy as possible, and simultaneously it should be chemically as stable as possible for a high durability. The chemical stability of the recording layer is also important, because it determines to a great extent, whether for the reflective layer a very noble and expensive metal has to be utilised or whether a less noble metal is sufficient. Furthermore, the solution of the recording medium, which is used for the production of the recording layer, has to have precisely defined rheological characteristics for the application by means of centrifugal force in such a manner, that the resulting layer has an accurately defined and as uniform as possible thickness, and it also has to be able to be dried rapidly and without any problems.

The dyes usually utilised in the recording layers of data storage devices and being changeable in their optical characteristics by a writing beam are, for example, cationic methine or poly-methine dyes (cyanin dyes, phthalo-cyanin dyes, azo dyes or metallized formazanes), which are commercially available, for example, as chlorides, bromides, fluorides, perchlorates, tetrafluoro borates or with anions of sulphone or carbonic acids. In order for the optical characteristics of the dyes to be easily changed by the writing beam, the recording medium in addition to the dye also contains a so-called quencher.

Dyes, which are suitable for utilisation in recording layers of data storage devices are described, for example, in the publications: EP-0403797, WO-93/22142, WO-98/14612, WO-99/37717, WO-99/05221, WO-98/34988, U.S. Pat. No. 5,900,348 (methine and poly-methine or cyanin dyes), JP-52047824, JP-58069255, JP-07314897 (phthalo-cyanin dyes), U.S. Pat. No. 5,731,054, U.S. Pat. No. 5,922,504 (metallised formazane dyes). It is also suggested to utilise mixtures of dyes, which contain two or three of the dyes mentioned.

Quenchers are also available on the market, for example under the trade name IRG 23 or IRG 003 by Nippon Kayako Co. Ltd.

It now becomes manifest that solutions, which contain the above mentioned known dyes and quenchers, are not very stable, because the quenchers are decomposable. For this reason, the solutions for the production of the recording layers cannot be made up in larger quantities and put into storage and in particular they cannot be unrestrictedly recycled. It also becomes manifest, that data storage devices with recording layers, which only contain the mentioned dyes and quenchers, can only be written to with limited speeds. Furthermore, such recording layers have a corrosive effect on the reflective layer in such a manner, that the latter has to be manufactured out of silver or gold to assure a sufficient durability of the data storage device.

The publication U.S. Pat. No. 5,436,113 describes an optical data storage device having a recording layer containing a phenol for stabilization.

It is the object of the invention to create a recording medium for recording layers of data storage devices, which recording medium comprises a significantly increased stability in comparison with known recording media, this both in the recording layer as well as in the solution utilised for the production of the recording layer.

This object is achieved by the recording medium for recording layers of optical data storage devices, by the process for the manufacture of the recording medium and by the data storage device, as they are defined in the corresponding independent claims.

The invention is based on the idea of stabilising the recording medium by the addition of a stabiliser in the form of a phenol with one or several hydroxy groups, which phenol is advantageously substituted. The phenol is present in the recording medium as a phenolate ion and is a substitute for a part of the usual counter-ions of the cationic dye (e.g., perchlorate ions). The recording medium can be stabilised even further by the substitution of a further part of the counter-ions of the cationic dye by metallo-organic thiolene complex anions, which can also take over the quencher function in such a manner, that in such a case no conventional quencher has to be added to the recording medium. Suitable for this purpose are in particular anionic thiolene complexes with a central metal atom, which has at least two valences.

A recording medium and a solution of this medium, which contain a cationic dye (or a mixture of several cationic dyes) with conventional anions and a commercially available quencher, manifest a significantly higher stability, when they in addition contain an advantageously substituted phenol as a stabiliser. This effect is even in-creased by the substitution of part of the conventional anions by the phenol, resp., by corresponding phenolate ions. A further increase of the stability results from the substitution of further anions and from the substitution of the quencher by an anionic, metallo-organic thiolene complex.

The enhanced stability of the recording medium in accordance with the invention leads to the following advantages:

Data storage devices, which contain the recording medium, are more durable both in a written and an unwritten condition.

Because the recording medium is less corrosive, a less noble and therefore correspondingly cheaper metal, for example, aluminium, can be utilised for the reflective layer instead of silver or gold.

The solution utilised for the production of the recording layer can be made use of over a longer period of time and in particular it can in essence be recycled without any limitation, so that no environmentally hazardous waste materials result.

It also becomes manifest, that data storage devices containing the recording medium in accordance with the invention possess further advantages over known data storage devices in addition to the above mentioned advantages which can be directly derived from the enhanced stability of the recording medium. These further advantages regarde the writing and reading quality and they are in particular:

The optical characteristics of the recording layer important for writing and reading are improved.

The pit shapings are more sharp-edged.

The data storage devices can be written to with very good quality at the highest speeds (at least up to 16×).

Die rheological characteristics of the solution of the recording medium are better, so that it can be applied to the carrier more rapidly and with a better groove filling and uniformity and therefore as a thinner and faster drying layer, as a result of which not only the writing and reading quality is improved, but also the cycle time is shortened and, because less dye has to be utilised, the product becomes cheaper to produce.

The recording medium is easily soluble in all solvents normally utilised in the production of optical data storage devices.

The recording medium for optical data storage devices according to the invention therefore comprises the following components:

a cationic dye (methine or poly-methine dye (cyanin dye), phthalo-cyanin dye, formazane dye or azo dye), the optical characteristics of which are changeable through the action of a writing beam;

a phenol with one or more hydroxy groups, which advantageously is a substituted phenol, as stabiliser, wherein the phenol advantageously is present in the form of phenolate ions and replaces a part of the usual, corrosively acting anions of the dye;

and a quencher or advantageously in place of the quencher an anionic metallo-organic thiolene complex taking over the quencher function and replacing a further part of the usual, corrosively acting anions of the dye and therefore, also contributing to the stability of the recording medium.

The recording medium according to the invention contains phenolate ions in a quantity relative to the quantity of dye in such a manner, the phenolate ions form between 1 and 30% (mol percent) of the anions. Recording media in accordance with the invention, which additionally contain an anionic, metallo-organic thiolene complex, contain it in a quantity relative to the dye quantity in such a manner, that it forms a further 1 to 50% of the anions. Because many stabiliser anions can have a negative influence on the optical characteristics of the recording medium, higher proportions of stabiliser ions are not advantageous. With higher proportions of metallo-organic thiolene complex ions, the solubility of the recording medium becomes insufficient.

Substituted phenols or corresponding phenolates advantageously utilised as stabilisers in the recording medium according to the invention are: 2,6-di-tert.-butyl-phenol, 2,6-di-tert.-butyl-4-methyl-phenol, 2-tert.-butyl-4-methyl-phenol, 6-tert.-butyl-3-methyl-phenol, α-methyl-benzyl-phenols, 2,6-di-tert.-butyl-4-methoxy-phenol, 4-hydroxy-3,5-di-tert.-butyl-benzyl alcohol, 6-tert.-butyl-2-methyl-phenol, esters of the β-(4-hydroxy-3,5-di-tert.-butyl-phenyl) propionic acid, 2,5-di-tert.-butyl-hydroquinone, 2,5-di-tert.-amyl-hydroquinone, 2,2'-methylene-bis(6-tert.-butyl-4-methyl-phenol), 2,2'-methylene-bis(4,6-dimethyl-phenol), 2,2'-isobutylidene-bis(4,6-dimethyl-phenol,), 2,2'-methylidene-bis(4-methyl-6-α-cyclo-hexyl-phenol), 4,4'-methylene-bis(2,6-di-tert.-butyl-phenol), 4,4'-butylidene-bis(6-tert.-butyl-3-methyl-phenol), 2,2'-thiobis(6-ter.-butyl-4-methyl-phenol), 2,2'-thiobis(4-methyl-6-α-methyl-benzyl-phenol), 2,2'-thiobis(4,6-di-sec.-amyl-phenol), 4,4'-thiobis (6-tert.-butyl-2-methyl-phenol), 4,4'-thiobis(6-tert.-butyl-3-methyl-phenol), bis(4-hydroxy-3,5-di-tert.-butyl-benzyl) sulphide, 1,1,3-tris(5'-tert.-butyl-4'-hydroxy-2'-methyl-phenyl)butane, 2,4,6-tria(4'-hydroxy-3',5'-di-tert.-butyl-benzyl)mesitylene, 2,4-dihydroxy-benzophenone, 4-alcoxy-2-hydroxy-benzophenone, 2-hydroxy-4-methoxy-benzophenone or mixtures of two or more than two of the mentioned phenols, resp., phenolates.

An observed change of the optical characteristics of the dyes caused by the stabiliser ions leads one to suspect, that ion complexes are formed, which are not only held together by electro-static forces, but also by coordination forces.

An anionic thiolene metal complex with quencher function, which is suitable for the recording medium according to the invention, is for example a di-thiolene-metal complex with the following formula:

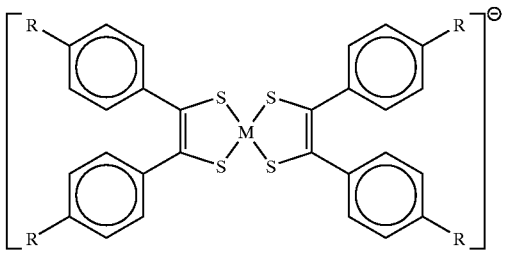

wherein M is=Ni, Co, Fe, Cu, Sn, Zn, Al, Ti, Cr, V, Pt or Pd; and wherein —R is=—H, —Cl, —Br, —J, —F, —NO$_2$, —CSN, —CN, —OCH$_3$, —OC$_n$H$_{(2n+1)}$ with n=1 to 20 or —COOR with R=OC$_n$H$_{(2n+1)}$.

The ion substitution, which is advantageous for the production of the recording medium according to the invention, is achieved in that the phenol is utilised in the form of a phenolate, for example, as potassium phenolate, in that the dye and the phenolate are dissolved in an organic solvent (e.g., dimethyl-formamide or acetone) and the solution is stirred over a longer time period (e.g., 2 to 12 hours) at an elevated temperature (e.g., 70–120°). Thereupon follows a step for the separation of the substituted ions forming water-soluble salts, for example, by washing with water. The substance obtained is then dried and when required for the making up of the solution for the production of the recording layer is dissolved in, for example, a mixture of diacetone alcohol and methyloxy-ethanol, of diacetone alcohol and butanol, of diacetone alcohol and isopropanol or in another suitable organic solvent or mixture of solvents.

EXAMPLE 1

Dye OM57, a cyanin dye with five methine groups, which is produced by the company Fuji Photo Film Co. Ltd, quencher IRG 23, which is produced by the company Nippon Kayako Co. Ltd, and 2,2'-thiobis(6-tert.-butyl-4-methyl-phenol) as stabiliser are mixed with the following weight ratios:Dye:quencher=10:1, dye:stabiliser=10:3. The mixture is dissolved in diacetone alcohol and isopropanol (10:1) with a concentration of 3% (by weight) by stirring at room temperature for at least 24 hours. Then the solution is pressure filtered under nitrogen through a filter of the type RC58 (Schleicher & Schuell). The dye solution produced in this manner is utilised for the production of recording layers, wherein it is continually stirred.

For the production of recording layers, the solution of the recording medium is applied to the side of polycarbonate carriers structured with grooves by spin-on deposition, with a layer thickness of approx. 180 to 220 nm. The coated carriers are then dried at 80° C. Onto the dried recording layer, a layer of silver of a thickness of approx. 60 to 90 nm is applied by sputtering using as such known methods. Thereupon the protective varnish is applied by spin-on deposition and hardened under ultraviolet light.

Thrown-off solution of the recording medium is prepared for recycling, in that a necessary quantity of quencher and solvent are admixed. Because of the increasing content of decomposed quencher, the recyclability is limited.

For determination of the durability of the data storage devices, these are aged at a temperature of 80° C. and a relative ambient humidity of 85% during 72 hours. Then test information is recorded onto the data storage devices with a Philips laser recorder type PCRW 404 and with the help of a calibrated CD-CATS measuring instrument, the BLER-value (block error rate) as well as the pit and land jitter-values are determined and compared with corresponding measurements of un-aged data storage devices written to.

EXAMPLE 2

To a 10% solution (percent by weight) of the dye OM 57 (as in example 1) in dimethyl-formamide, 20% (mol percent, relative to the dye) of the potassium salt of 2,2'-thiobis(6-tert.-butyl-4-methyl-phenol) is added. The solution is stirred for 2 hours at 70° C. The solution is then poured into cold water, wherein the organic components are precipitated and the water-soluble salts go into solution. The organic components are filtered off, re-crystallized from a solution of dimethyl-formamide and ethanol (4:1) and then dried.

Yield: 95%

For the production of recording layers, the ion compound of dye and stabiliser is then mixed with quencher IRG23 (quantity ratio dye:quencher=10:1) and is then dissolved and utilised as described in example 1. In doing so, the layer thickness of the recording medium applied by spin-on deposition can be reduced to 150 to 180 nm.

EXAMPLE 3

To a 10% solution (percent by weight) of the dye OM 57 (as in example 1) in dimethyl-formamide, are added 20% (mol percent, relative to the dye) of the potassium salt of 2,2'-thiobis(6-tert.-butyl-4-methyl-phenol) as well as 10% (mol percent, relative to the dye) of the tetrabutyl-ammonium salt of the thiolene complex with the formula 1, wherein M is=Co and —R=—OCH$_3$. The mixture is further processed in the manner which is described in example 2.

The ion compound of dye, stabiliser and thiolene complex produced in this manner is then dissolved without any addition of quencher for the production of recording layers and utilised as is described in example 1. In doing so, the layer thickness of the recording medium applied by spin-on deposition can be reduced to 130 to 150 nm. For the recycling of thrown off solution of recording medium, checking of the quencher content and addition of quencher is not necessary.

The following table contains test results for the optical data storage devices produced in accordance with the examples 1 to 3 in comparison with a data storage devices with a recording layer containing only dye OM 57 and quencher IRG 23 (weight ratio 10:1) (state of prior art).

|  | Percentage change before/after test aging [%] | | |
| --- | --- | --- | --- |
|  | BLER | pit-jitter | land-jitter |
| Comparison data storage device (state of prior art) | 30 | 24 | 26 |
| Data storage device according to example 1 | 12 | 10 | 12 |

|  | Percentage change before/after test aging [%] | | |
| --- | --- | --- | --- |
|  | BLER | pit-jitter | land-jitter |
| Data storage device according to example 2 | 5 | 2 | 3 |
| Data storage device according to example 3 | 1 | 0 | 1 |

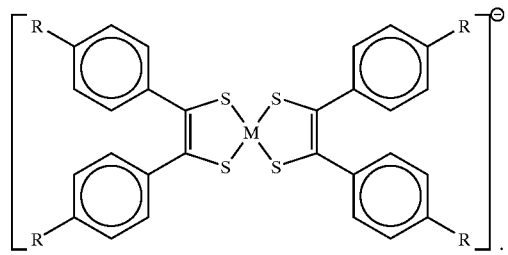

What is claimed is:

1. Recording medium for optical data storage devices, which recording medium comprises a cationic dye or a mixture of cationic dyes with optical characteristics, which are changeable by means of a writing beam and further comprises at least one substance with a quencher function and a phenol or substituted phenol with one or more hydroxy groups as a stabiliser, characterized in that the phenol or substituted phenol is present in the medium in the form of phenolate ions and forms a part of the anions for the dye cations.

2. Medium according to claim 1, characterized in that the stabiliser comprises anions of 2,6-di-tert.-butyl-phenol, 2,6-di-tert.-butyl-4-methyl-phenol, 2-tert.-butyl-4-methyl-phenol, 6-tert.-Butyl-3-methyl-phenol, α-methyl-benzyl-phenols, 2,6-di-tert.-butyl-4-methoxy-phenol, 4-hydroxy-3,5-di-tert.-butyl-benzyl alcohol, 6-tert.-butyl-2-methyl-phenol, esters of the β-(4-hydroxy-3,5-di-tert.-butyl-phenyl) propionic acid, 2,5-di-tert.-butyl-hydroquinone, 2,5-di-tert.-amyl-hydroquinone, 2,2'-methylene-bis(6-tert.-butyl-4-methyl-phenol), 2,2'-methylene-bis(4,6-dimethyl-phenol), 2,2'-isobutylidene-bis(4,6-dimethyl-phenol), 2,2'-methyliden-bis(4-methyl-6-α-cyclo-hexyl-phenol), 4,4'-methylene-bis(2,6-di-tert.-butyl-phenol), 4,4'-butylidene-bis(6-tert.-butyl-3-methyl-phenol), 2,2'-thiobis(6-ter.-butyl-4-methyl-phenol), 2,2'-thiobis(4-methyl-6-α-methyl-benzyl-phenol), 2,2'-thiobis(4,6-di-sec.-amyl-phenol), 4,4'-thiobis(6-tert.-butyl-2-methyl-phenol), 4,4'-thiobis(6-tert.-butyl-3-methyl-phenol), bis(4-hydroxy-3,5-di-tert.-butyl-benzyl) sulphide, 1,1,3-tris(5'-tert.-butyl-4'-hydroxy-2'-methyl-phenyl)butane, 2,4,6-tria(4'-hydroxy-3',5'-di-tert.-butyl-benzyl)mesitylene, 2,4-dihydroxy-benzophenone, 4-alcoxy-2-hydroxy-benzophenone, 2-hydroxy-4-methoxy-benzophenone or of a mixture of said phenolate ions.

3. Medium in accordance with claim 1, wherein, as a substance with a quencher function, it comprises an anionic, metallo-organic thiolene complex, which forms a part of the anions for the dye cations.

4. Medium according to claim 3, characterized in that the anionic, metallo-organic complex is a di-thiolene-complex of the following formula, wherein M is=Ni, Co, Fe, Cu, Sn, Zn, Al, Ti, Cr, V, Pt or Pd and wherein —R is=—H, —Cl, —Br, —J, —F, —NO$_2$, —CSN, —CN, —OCH$_3$, —OC$_n$H$_{(2n+1)}$ with n=1 to 20 or —COOR with R=OC$_n$H$_{(2n+1)}$ 5. Medium in accordance with claim 1, wherein it comprises the dye and the stabiliser in a mol ratio of between 100:1 and 100:30.

6. Medium according to claim 3, wherein it comprises the dye and the anionic, metallo-organic thiolene complex in a mol ratio of between 100:1 and 100:50.

7. Medium in accordance with claim 1, wherein it is dissolved in an organic solvent or in a mixture of organic solvents.

8. Method for the production of the recording medium in accordance with claim 1, wherein the dye and the stabiliser are dissolved in an organic solvent, that the solution is stiffed at an elevated temperature and that in a further step water-soluble salts are separated to an as large degree as possible from the solution.

9. Method according to claim 8, characterized in that the anionic, metallo-organic thiolene complex is dissolved together with the dye and the stabiliser.

10. Method in accordance with claim 8, wherein, for the separation of the water-soluble salts, the stirred solution is washed with water.

11. Optical data storage device with a carrier, with a recording layer located on top of the carrier and consisting of a recording medium according to claim 1, with a reflective layer located on top of the recording layer and with a protective varnish layer located on top of the reflective layer.

12. Optical data storage device according to claim 11, characterized in that the reflective layer consists of silver, gold or aluminium.

13. Method for the production of optical data storage devices with a carrier, with-a recording layer located on top of the carrier, with a reflective layer located on top of the recording layer and with a protective varnish layer located on top of the reflective layer, wherein the carrier is manufactured by injection moulding, wherein for a recording layer, a recording medium is applied by spin-on deposition to the carrier and thereupon the solvent is removed from the recording medium applied by spin-on deposition, wherein a metal layer is applied to the recording layer as a reflective layer by sputtering and wherein the metal layer is covered by a protective varnish, characterized in that the dissolved recording medium is a medium in accordance with claim 1.

14. Method in accordance with claim 13, characterized in that the metal layer consists of gold, silver or aluminium.

* * * * *

UNITED STATES PATENT AND TRADEMARK OFFICE
CERTIFICATE OF CORRECTION

PATENT NO. : 6,743,494 B1
DATED : June 1, 2004
INVENTOR(S) : Zafirov et al.

It is certified that error appears in the above-identified patent and that said Letters Patent is hereby corrected as shown below:

Column 7,
Line 57, after "R=OC$_n$H$_{(2n+1)}$" insert -- • --.

Column 8,
Line 43, delete "with-a" and insert -- with a --.

Signed and Sealed this

Twenty-eighth Day of September, 2004

JON W. DUDAS
*Director of the United States Patent and Trademark Office*